United States Patent Office 2,917,144
Patented Dec. 15, 1959

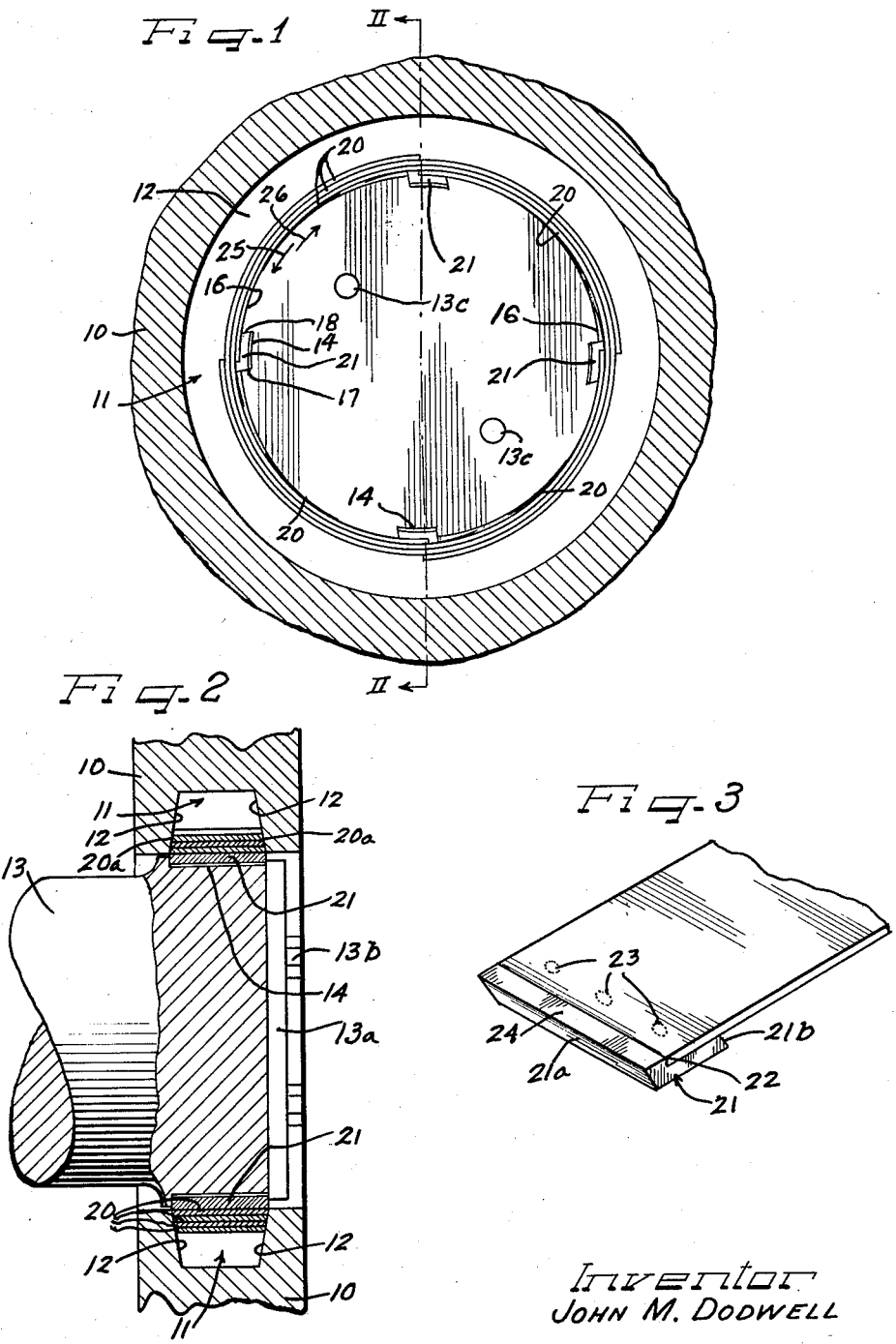

2,917,144

CLUTCH

John M. Dodwell, Piedmont, Quebec, Canada

Application March 26, 1956, Serial No. 573,832

7 Claims. (Cl. 192—41)

The present invention relates to improvements in the art of free-wheeling or overrunning clutches and is, more particularly, concerned with the provision of a substantially improved clutch of the overlapping torque-transmitting band friction type clutch of the general class illustrated in my prior Patent No. 2,518,453.

More particularly, the present invention is concerned with the provision of a clutch employing flexible bands operating in a V-groove in such a manner as to transmit torque between clutching members with the bands acting in compression, rather than tension.

As described in my earlier United States patent, clutching or torque-transmitting action may be extremely satisfactorily provided by a flexible spring band acting in co-operation with the angled side walls of a V-groove. The present invention contemplates the provision of a novel and highly effective band and V-groove clutch wherein the band or bands is/are arranged to transmit torque with the bands acting in compression rather than in tension, as in the illustrated embodiments of the drawings accompanying my earlier patent.

In accordance with the principles of the present invention this compression torque-loading is provided by constructing the clutch with concentric inner and outer members and providing the outer member with an internally facing V-groove. The bands are spirally disposed in the V-groove such that their outer ends are snugly engaged with the side walls of the V-groove and the inner ends are secured to the inner clutch member. Under such a structural relationship, rotation of the clutching members relative to each other in one direction will cause the bands to wrap up closely around the inner clutching member, causing slip between the bands and the outer member. On the other hand, relative rotation between the clutching members in the opposite direction will cause outward expansion of the bands into wedging engagement with the side walls of the V-groove to provide a locking, torque-transmitting action. With the parts operating in this manner the torque forces transmitted are such as to provide compression loading of the individual clutch bands. This is extremely important since it permits substantially greater torque loading of the individual bands and substantially eliminates failure of the connection between the bands and the clutch member to which they are secured by means of a key, since the point of securement between the key and the band is not in tension.

It is, accordingly, an object of the present invention to provide a substantially improved clutch construction.

Another object of the present invention is to provide a clutch of the wedging, flexible torque-transmitting band type wherein torque is transmitted by compression of the bands.

Still another object of the present invention is to provide a substantially stronger flexible band, wedging engagement type clutch in which the bands are stationary.

A feature of the present invention resides in the provision of a flexible wedging torque-transmitting band spirally disposed between inner and outer clutching members such that the outer clutching member has an inwardly facing V-groove for cooperating with the outer end of the band and the inner clutching member has means for securing the inner end of the band thereto.

Another feature of the invention is the provision of an outwardly expanding, compression loaded flexible torque-transmitting band.

Still other and further objects and features of the present invention will at once become apparent to those skilled in the art from a consideration of the attached sheet of drawings, wherein a preferred embodiment of the present invention is shown by way of illustration only, and wherein—

Figure 1 is an elevational view in cross section, of a clutch constructed in accordance with the principles of the present invention;

Figure 2 is a cross sectional view, in elevation, taken along the line II—II of Figure 1; and Figure 3 is an enlarged oblique view of one form of connection between the flexible band and a key of the present invention.

As shown on the drawings:

As may be seen from consideration of the figures, an outer clutching member 10 is provided with an inwardly facing V-groove generally indicated at 11 having side walls 12. An inner clutching member 13 is concentrically mounted within the outer clutch member 10 and, as may be seen from the consideration of Figure 1, the clutching member 13 is provided with a plurality of slots 14 opening at their outer ends at the peripheral surface 16. The inner clutch member 13 may be rotatable or fixed but, as will be discussed below, an important utilization of the present clutch lies in structures wherein the inner member 13 is stationary and the outer member 10 is mounted for rotation. The slots 14 are axially closed by a plate 13a secured by bolts 13b threaded in bores 13c.

As shown, each slot 14 carries a flexible spring metal clutch band 20. The individual bands 20 are generally spirally constructed and have a width, axially of the clutch members 10 and 13 which gradually decreases toward the outer end of the band to permit its progressively deeper seating in the V-groove 11. The inner end of each band is secured to the inner clutch member 13 by means of a key and keyway connection. Thus, a key 21 is secured to the inner end 22 of the band 20 by spot welding, as at 23, or equivalent process. A generally radially outwardly projecting abutment 24 is positioned between the end 22 of the band 20 and of the inner end 17 of the slot 14. It will be apparent, therefore, that movement of the band 20 in the direction of the arrow 25 will cause the key 21 to move against the slot end wall 17, thereby preventing continued movement. On such movement, the abutment 24 serves to distribute the load from the relatively thin end 22 of the band 20 over a relatively large area of the slot end wall 17. By constructing the key 21 of relatively hard material, a relatively soft material may be utilized as the inner clutch member 13 in spite of the extremely high loads imposed by movement of the bands in the direction of the arrow 25. Movement of the bands in the direction of the arrow 26 will cause the key 21 to engage the wall 18 of the slot 14, thereby preventing separation of the band 20 from its respective slot.

As shown in Figures 1 and 3, the surfaces 21a and 21b of the key 21 are inclined at an oblique angle to the band 20. As a result of this angularity compression forces on the bands will act to move the keys 21 and the bands 20 radially outwardly into engagement with the walls 12 and each other. The slight tensioning of the bands during reverse movement causes the angled key face 21b to move the key and band radially inwardly helping to minimize band contact with the grooves.

In operation, when the clutching member 10 is rotated in the clockwise direction as viewed in Figure 1, relative to the inner member 13, the frictional drag between the side walls 12 of the V-groove 11 on the side edges 20a of the bands will tend to force the bands radially inwardly toward the inner clutch member 13, permitting a slipping action between the clutch member 10 and the bands. This slipping action aided by the radially inward movement of the keys 21, permits rotation of the clutch member 10 in the clockwise direction relative to the inner clutch member 13. On the other hand, when the clutch member 10 rotates in the counterclockwise direction as viewed in Figure 1, the frictional drag between the edges 20a and the side walls 12 operates to force the outer ends of the bands outwardly deeper into wedging engagement in the V-groove 11. Since the inner end 22 of the individual bands is secured against movement except slight radially outward movement, the clutch member 10 will lock up and rotation of the member 10 in the counterclockwise direction relative to the inner clutch member 13 will be prevented. It will be understood, of course, that the bands 20 are preferably constructed of high quality spring metal and a slightly greater spiral than the spiral form assumed in the assembled condition, shown in the drawings. Thus, there is a resilient biasing force acting within the individual band tending to force the outer end thereof outwardly into relatively light engagement with the side walls 12 of the V-groove. This light engagement provides sufficient frictional contact between the bands 20 and the V-groove to permit an energization of the clutch.

As above mentioned, an important utilization of the present invention lies in installations wherein the inner clutch member 13 is stationary and the outer clutch member 10 is to be permitted to rotate in one direction only relative thereto. In such circumstances, the clutch bands 20 are stationary and no centrifugal forces act upon them. Accordingly, under such circumstances rotation of the outer clutch member 10 in a clockwise direction as viewed in Figure 1 will meet with a minimum of drag, thereby minimizing wear on the bands 20. This construction provides a clutch extremely suitable for such installations as automotive transmissions or the like wherein overrunning stator elements are provided. In such transmissions it is desired that minimum wear be encountered and, further, that the drag of the stator elements when over-running be held at an absolute minimum.

It will thus be seen that I have provided a novel and substantially improved clutch construction. The clutching forces existing within the clutch when it is operating to transmit torque between the numbers 10 and 13 is in all cases such as to provide a compressive load on the individual bands. Since the end 22 of the individual band 20 is positioned against an abutment and operates directly to transmit the compressive forces in the band to the clutch member 13, there is no tendency for the individual band to tear loose from the key 21 or from the clutch member 13 as sometimes occurs in clutches employing bands under tension. It has been found that compression forces in the individual band 20 do not cause destruction of the band either through columnar deflections or failure in compression. It will be obvious, of course, that utilization of a larger number of bands will provide a greater compactness within the band structure, thereby further minimizing columnar effects. For most purposes, however, the number of bands illustrated is satisfactory and for some uses as few as a single band may be employed.

Since it will be apparent that variations and modifications may be made when the structures about described without departing from the novel concepts of the present invention it is my intention that the scope of the invention be limited solely by that of the hereinafter appended claims.

I claim as my invention:

1. In combination in a free-wheeling clutch, relatively rotatable inner and outer concentric clutch members and a torque transmitting band spirally disposed therebetween, said outer clutch member having a V-groove in the inner peripheral surface thereof, said band having its outermost end lying in said V-groove and having its inner end positioned in an axially extending slot in the outer peripheral surface of the inner clutch member, said inner end having means associated therewith cooperating with said slot to prevent said band from disengaging from said slot, whereby relative rotation of said members in one direction will cause said band to wedge under compression load in said V-groove to transmit torque between said members while relative rotation in the other direction will cause said band to slip relative to the walls of said V-groove, said last named means comprising a key secured to said band and lying in said axially extending slot, said slot and said key having cooperating faces inclined at an oblique angle to a tangent to the periphery of the inner clutch member at the slot.

2. In combination in a free-wheeling clutch, relatively rotatable inner and outer concentric clutch members and a torque transmitting band spirally disposed therebetween, said outer clutch member having a V-groove in the inner peripheral surface thereof, said band having its outermost end lying in said V-goove and having its inner end positioned in an axially extending slot in the outer peripheral surface of the inner clutch member, said inner end having means associated therewith cooperating with said slot to prevent said band from disengaging from said slot, whereby relative rotation of said members in one direction will cause said band to wedge under compression load in said V-groove to transmit torque between said members while relative rotation in the other direction will cause said band to slip relative to the walls of said V-groove, said last-named means comprising a key secured to said band and lying in the axially extending slot, said key being provided with a generally radially extending abutment cooperating with the inner end of the band to transmit compressive load from the band to the inner end of said slot.

3. In combination in a free-wheeling clutch, relatively rotatable inner and outer concentric clutch members and a plurality of overlapping torque transmitting bands spirally disposed therebetween, said bands having the outer ends lying in a V-groove in the inner peripheral surface of the outer member, each said band having its inner end positioned in an axially extending slot in the outer peripheral surface of the inner member and having means associated therewith cooperating with said slot to prevent each said band from disengaging from its respective slot, whereby relative rotation of said members in one direction will cause said bands to wedge under compressive load to transmit torque between said members while relative rotation in the other direction will cause said bands to slip relative to the walls of said V-groove, said means comprising a key secured to each said band and lying in a respective slot, each said slot and key having cooperating faces inclined at an oblique angle to a tangent to the periphery of the inner clutch member at the slot.

4. In combination in a free-wheeling clutch, relatively rotatable inner and outer concentric clutch members and a plurality of overlapping torque transmitting bands spirally disposed therebetween, said bands having the outer ends lying in a V-groove in the inner peripheral surface of the outer member, each said band having its inner end positioned in an axially extending slot in the outer peripheral surface of the inner member and having means associated therewith cooperating with said slot to prevent each said band from disengaging from its respective slot, whereby relative rotation of said members in one direction will cause said bands to wedge under compressive load to transmit torque between said members while relative rotation in the other direction will cause said bands to slip relative to the walls of said V-groove, said means comprising a key secured to each said band and lying in a respective slot, said key being provided with a generally radially extending abutment cooperating with the inner end of its respective band to transmit compressive loads from its bands to the inner end of said slot.

5. In combination in a free-wheeling clutch, relatively rotatable inner and outer concentric clutch members and a torque transmitting band spirally disposed therebetween, said outer clutch member having a V-groove in the inner peripheral surface thereof, said band having its outermost end lying in said V-groove and having its inner end positioned in an axially extending slot in the outer peripheral surface of the inner clutch member, said inner end having means associated therewith cooperating with said slot to prevent said band from disengaging from said slot, whereby relative rotation of said members in one direction will cause said band to wedge under compression load in said V-groove to transmit torque between said members while relative rotation in the other direction will cause said band to slip relative to the walls of said V-groove, said last-named means comprising a key secured to said band and lying in a respective slot, said key being provided with a generally radially extending abutment cooperating with the inner end of the band to transmit compressive loads from the band to the inner end of said slot, said key being secured to said band by spot welding.

6. In combination in a free-wheeling clutch, relatively rotatable inner and outer concentric clutch members and a plurality of overlapping torque transmitting bands spirally disposed therebetween, said bands having the outer ends thereof lying in the radially inwardly opening V-groove in the inner peripheral surface of the outer member and in frictional engagement with the side walls of said V-groove, each said band having its inner end secured to said inner clutch member by cooperating axially extending abutment surfaces on the inner end of the band and on the inner clutch member to prevent movement of said band relative to said inner clutch member in one direction, said abutment surfaces having an axial dimension substantially the same as the axial width of the inner end of the respective band means preventing movement of said band relative to said inner clutch member in the other direction, the frictional engagement between the outer end of each said band and said V-groove causing attempted movement of said band in said one direction and resultant outward radial expansion of said band into wedging cooperation with said V-groove to apply a compressive load to said band to transmit torque between said clutch members through said abutment surfaces, while relative rotation in the other direction will cause said bands to slip relative to the walls of said V-groove.

7. In combination in a free-wheeling clutch, relatively rotatable inner and outer concentric clutch members and a plurality of overlapping torque transmitting bands spirally disposed therebetween, said bands having the outer ends thereof lying in the radially inwardly opening V-groove in the inner peripheral surface of the outer member and in frictional engagement with the side walls of said V-groove, each said band having its inner end secured to said inner clutch member by cooperating axially extending abutment surfaces on the inner end of the band and on the inner clutch member to prevent movement of said band relative to said inner clutch member in one direction, said abutment surfaces having an axial dimension substantially the same as the axial width of the inner end of the respective band means preventing movement of said band relative to said inner clutch member in the other direction, the frictional engagement between the outer end of each said band and said V-groove causing attempted movement of said band in said one direction and resultant outward radial expansion of said band into wedging cooperation with said V-groove to apply a compressive load to said band to transmit torque between said clutch members through said abutment surfaces, while relative rotation in the other direction will cause said bands to slip relative to the walls of said V-groove, said abutment surfaces being inclined at an oblique angle to a tangent to the periphery of the inner clutch member at the location of the abutment surface on said inner clutch member.

References Cited in the file of this patent

UNITED STATES PATENTS 2,518,453     Dodwell _____ Aug. 15, 1950